United States Patent [19]

Vora et al.

[11] Patent Number: 4,963,647

[45] Date of Patent: * Oct. 16, 1990

[54] POLYAMIDE-IMIDE POLYMERS HAVING 12-F FLOURINE-CONTAINING LINKING GROUPS

[75] Inventors: Rohitkumar H. Vora, Westfield, Paul N. Chen. Sr., Morris, both of N.J.; Jeffrey S. Devolve, Warwick, R.I.

[73] Assignee: Hoechst Celanese Corp., Somerville, N.J.

[*] Notice: The portion of the term of this patent subsequent to Sep. 4, 2007 has been disclaimed.

[21] Appl. No.: 316,254

[22] Filed: Feb. 27, 1989

[51] Int. Cl.$^5$ ...................... C08G 69/26; C08G 69/28
[52] U.S. Cl. .................................... 528/350; 528/172; 528/173; 528/179; 528/185; 528/188; 528/189; 528/351; 528/352; 528/353
[58] Field of Search ............... 528/350, 172, 173, 179, 528/185, 188, 189, 351, 352, 353

[56] References Cited

U.S. PATENT DOCUMENTS

| | | | |
|---|---|---|---|
| 3,347,828 | 10/1967 | Stephens et al. | 528/179 |
| 3,494,890 | 3/1971 | Morello | 528/179 |
| 3,661,832 | 5/1972 | Stephens | 524/323 |
| 3,817,921 | 6/1974 | Brode et al. | 528/188 |
| 3,920,612 | 11/1975 | Stephens | 528/188 |
| 4,448,925 | 5/1984 | Hanson | 524/600 |
| 4,575,924 | 3/1986 | Reed et al. | 29/576 |

Primary Examiner—John Kight, III
Assistant Examiner—P. Hampton Hightower
Attorney, Agent, or Firm—Perman & Green

[57] ABSTRACT

The present invention provides novel heat stable polyamide-imide polymers having excellent flow properties which render them more readily processible into fibers, films, sheets and other molded articles. The polymers are prepared by forming the polycondensation product of one or more aromatic diamines and one or more trifunctional acid anhydride monomers, wherein at least one of said diamine monomers is a 12F-Diamine or 12F-Oxydiamine containing at least two $CF_3$

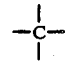

R groups linking two aromatic moieties, wherein R is $CF_3$ or phenyl. In addition to improved flow properties, the polyamide-imide polymers of this invention also exhibit improved solubility properties in most organic solvents, improved resistance to attack by chlorinated solvents such as trichloroethylene as compared with polyimides, improved hydrophobic properties as well as excellent thermal properties including resistance to thermooxidative degredation.

14 Claims, No Drawings

POLYAMIDE-IMIDE POLYMERS HAVING 12-F FLOURINE-CONTAINING LINKING GROUPS

BACKGROUND OF THE INVENTION

This application is related to copending application Ser. Nos. 316,380, 316,342, and 316,220, all filed on even date herewith.

1. Field of the Invention

The present invention relates to aromatic polyamide-imide polymers based on amino-monomers containing two hexafluoroisopropylidine linking groups or two 1-phenyl-2,2,2-trifluoroethane linking groups, and having improved physical, mechanical and chemical properties, and to a method for preparing such polymers.

2. Description of Related Art

Polyamide-imide polymers and copolymers are known in the art. These materials are generally prepared by the condensation polymerization of trifunctional acid monomers such as the 4-acid chloride of trimellitic anhydride and one or more aromatic diamines. Examples of such polyamide-imide polymers are disclosed in U.S. Pat. Nos. 3,347,828, 3,494,890, 3,661,832, 3,920,612 and 4,713,438. These polymers may be characterized by extremely good high temperature properties (Tg of about 275° C. or higher), good high temperature stability, good tensile strength at high temperatures, good mechanical properties and good chemical resistance. These polyamide-imides are useful as wire enamel coatings, laminates, molded products, films, fibers impregnating varnishes and in other applications where high thermal stability is required.

One of the problems associated with such polymers is that they exhibit generally poor flow properties which render them difficult to process, particularly to injection mold or to spin into fibers. These polymers are also relatively hydrophilic and tend to absorb moisture which can effect their clarity, heat stability, processability, mechanical and electrical properties.

Attempts have been made in the art to improve the flow properties of polyamide-imide polymers. For example, U.S. Pat. No. 4,448,925 discloses including from about 1 to about 10 percent phthalic anhydride into the polymerization recipe to provide polyamide-imide copolymers having improved flow properties. However, this technique for improving flow properties is made at the expense of the heat stability and chemical resistance of the polymer. Yet another method for improving the flow properties of such polymers is to form blends thereof with up to about 10% by weight of a polyamide polymer such as nylon 6 or nylon 66, as disclosed in U.S. Pat. No. 4,575,924. Once again however, such an approach to solving the flow problem is made at the expense of the thermal stability and optical clarity of the resultant polymer blend.

Copending application Ser. No. 316,380 discloses polyamide-imide polymers prepared by condensing a trifunctional acid anhydride monomer such as 4-trimellitoyl amhydride chloride with an aromatic diamine containing the hexafluoroisopropylidene linking group, such as 2,2-bis (4-aminophenyl) hexafluoropropane (6F-Diamine). These polyamide-imide polymers exhibit excellent thermal properties and also posses improved processability.

Polyamides prepared from so-called 12-F monomers are disclosed in Applicant's copending application Ser. No. 124,744, filed in the USPTO on Nov. 24, 1987. These polyamides may be prepared by forming the polymer condensation product of a 12F-Diacid choride such as 4,4'-bis [2-(4-chlorocarbonylphenyl) hexafluoroisopropyl] diphenylether with one or a mixture of aromatic diamines. Similarly, copending application Ser. No. 124,704 filed in the USPTO on Nov. 24, 1987, discloses polyamide polymers prepared by forming the polymer condensation product of a 12F-Diamine such as 4,4'-bis [(4-aminophenoxyphenyl) hexafluoroisopropyl] diphenyl ether with one or more diacids or diacid halides.

SUMMARY OF THE INVENTION

The present invention provides novel heat stable polyamide-imide polymers having excellent flow properties which render them more readily processible into fibers, films sheets and other molded articles. The polymers are prepared by forming the polycondensation product of one or more aromatic diamines and one or more trifunctional acid anhydride monomers at least one of said diamine monomers containing two

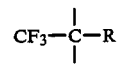

groups linking two aromatic moieties, wherein R is CF$_3$ or phenyl. In addition to improved flow properties, the polyamide-imide polymers of this invention also exhibit improved solubility properties in most organic solvents, improved resistance to attack by chlorinated solvents such as trichloroethylene as compared with polyimides, improved hydrophobic properties as well as excellent thermal properties, including resistance to thermooxidative degredation.

DETAILED DESCRIPTION OF THE INVENTION

The polyamide-imide polymers of the present invention may be characterized as having structural units of the formula:

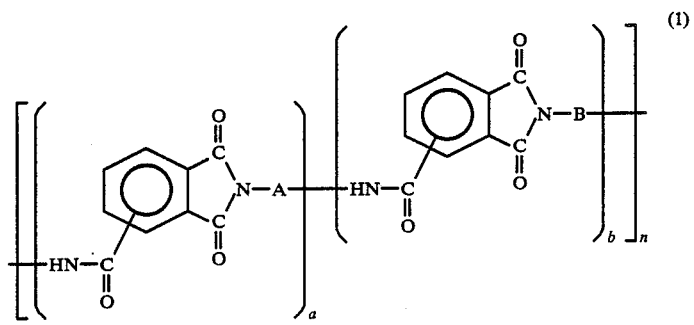

wherein the terms (a) and (b) are equal to the mole fraction of each recurring unit in the polymer chain and (a) ranges from about 0.0 to about 0.95, (b) ranges from about 0.05 to about 1.00, with the proviso that the sum of (a) and (b) is equal to 1.00, n is a number sufficient to give rise to a polymer having inherent viscosity of at least about 0.1 as measured from a solution of the polymer in dimethyl acetamide at 25° C. at a polymer concentration of 0.5 weight percent, A is a divalent aromatic moiety, and B is the residuum of a diavalent aromatic diamine having the structure:

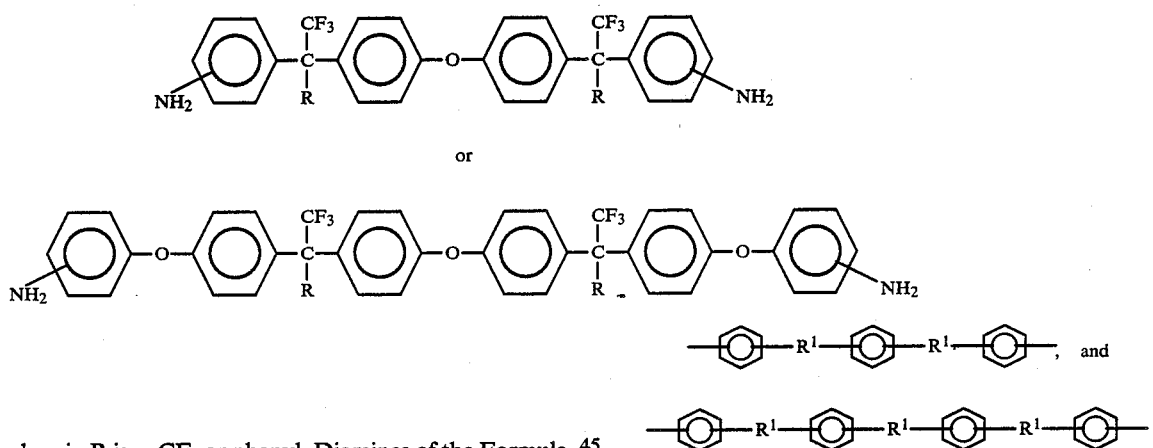

wherein R is —CF$_3$ or phenyl. Diamines of the Formula 2 are hereinafter referred to as 12F-Diamine and those of Formula (3) as 12F-Oxydiamine.

The preferred polyamide-imide polymers of this invention are those prepared using 12F-Diamine monomers such as 4,4′-bis [4-(aminophenoxyphenyl) hexafluoroisopropyl] diphenyl ether, 4,4′-bis [3-(aminophenoxyphenyl) hexafluoroisopropyl] diphenyl ether (also known as 12F-Oxydiamines), 4-4′-bis [2-(4-aminophenyl) hexafluoroisopropyl] diphenylether, and 4,4′-bis[2-(3 aminophenyl) hexafluoroisopropyl] diphenyl ether (also known as 12F-Diamines). 12F-Oxydiamines and their method of preparation are disclosed in West German patent application P No. 37 39 799.0, filed on Nov. 24, 1987 in West Germany.

In the polyamide-imides of Formula 1, wherein (a) is greater than zero, (a) may be the divalent residuum of one or a combination of aromatic diamines having the formula:

NH$_2$—R—NH$_2$ (4)

wherein R is the aromatic moiety of a phenylene, naphthalene, bis or polyphenylene type compound. R is preferably selected from:

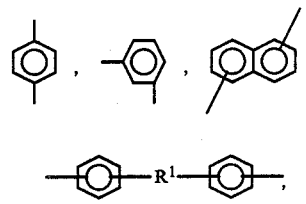

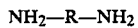

wherein R' is a divalent moiety independently selected from a covalent carbon to carbon bond, methylene, ethylene, propylene, isopropylene, hexafluoroisopropylidene, 1-phenyl-2,2,2-trifluoroethylidene, dichloro and difluoroalkylenes up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene up to 8 Si atoms disil- oxanylene, and a polysiloxanylene up to 8 Si atoms. Preferably, the linking group R' links two aryl moieties and is selected from oxy, hexafluoroisopropylidene, 1-phenyl-2,2,2-trifluoroethylidene, carbonyl, methylene, a covalent carbon to carbon bond, disiloxanylene and polysiloxanylenes. Most preferably, R' is a carbon to carbon bond, methylene, hexafluoroisopropylidene, 1-phenyl-2,2,2-trifluoroethylidene and oxy.

The hydrogen atoms of the aromatic groups A and/or B may be substituted by one or more non-interfering monovalent substituents such as chloro, fluoro, lower alkyl or alkoxy having up to 6 carbon atoms, and phenyl. Also, the term "aromatic" as used herein is meant to include heteroaromatics wherein one or more of the ring atoms is replaced with —O—, —S— or —N— atoms.

Divalent diamine monomers which may be used in preparing the polyamide-imide copolymers of the present invention wherein (a) in Formula 1 is greater than zero include:
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl)sulfone;
bis(4-aminophenyl) sulfone;
4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-napthalene;
2,6-diamino-naphthalene;
1,4-diamino-2-methyl-napthalene;
1,5-diamino-2-methyl-naphthalene;
1,3-diamino-2-phenyl-naphthalene;
4,4'-diamino-biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;

2,2-bis(4-aminophenyl)hexafluoropropane;
2,2-bis(3-aminophenyl)hexafluoropropane;
2-(3-aminophenyl)-2-(4-aminophenyl)hexafluoropropane;
2,2-bis[4-(4-aminophenoxy)phenyl]hexafluoropropane;
2,2-bis[4-(2-chloro-4-aminophenoxy)phenyl]hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl)hexafluoropropane;
1,5-bis(3-aminophenyl)decafluoropentane; and mixtures thereof.

It is also within the scope of the present invention to prepare polyamide-imides wherein the moiety A may also be the residuum of a 12F-Diamine monomer referred to above which is not the same as the particular 12F-Diamine represented by the moiety B., for example polyamide-imides prepared from a mixture of a 4,4'-12F Diamine and a 4,4'-12F Oxydiamine.

In the preferred embodiments of the present invention, polyamide-imides of formula 1 above are prepared by forming the polymer condensation product of a mixture of a 3 or a 4 trimellitic acid anhydride having the structure:

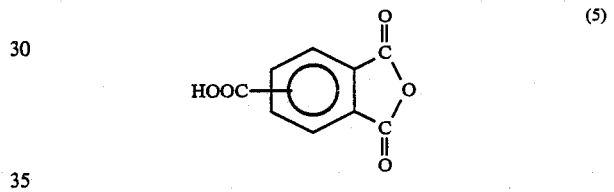

(5)

or an amide-forming derivative thereof, with one or more aromatic diamines of the structures of Formulas 2 and 3 above. The preferred anhydride is 4-trimellitoyl anhydride chloride (4-TMAC).

The preferred polyamide-imide polymers of this invention may be based 100 mole % on fluorine-containing diamine monomers as in the case of polymers of Formula 1 where (a) is zero. Where (a) is greater than zero, the polymers may contain from about 1 to about 95 mole percent of fluorine containing diamine monomers and more particularly from about 2 to about 50 mole percent of fluorine containing diamine monomers, based on the total weight of amino monomers present in the polymer.

The acid/anhydride and diamine reactants, particularly the diamines containing fluorine, are preferably substantially electronically pure and are referred to as electronic grade monomers. They generally should be at least about 98.5% pure, and more preferably at least about 99.5% pure.

The polyamide-imides of the present invention are preferably prepared by a solution polymerization process, i.e., by reacting the acid anhydride and diamine monomers in an appropriate solvent, optionally in the presence of a catalyst or an added inorganic salt such as lithium chloride or calcium chloride, and in a nitrogen atmosphere. Polymerization is conducted under anhydrous, isothermal polymerization conditions and preferably at a temperature of less than 50° C. The intermediate polyamide-polyamic acid reaction product is then cyclized to form the polyamide-imide either by chemical dehydration or by an appropriate heat treatment.

The polymer may be recovered by precipitation in water or an alcohol such as methanol, and washed.

The solvents useful in the solution polymerization process for synthesizing the polyamide-imide compositions are the organic solvents whose functional groups do not react with the reactants to any appreciable extent. In addition to being inert to the system, and preferably, being a solvent for the polyamide-imide, the organic solvent must be a solvent for at least one of the reactants, preferably for all of the reactants. The normally liquid organic solvents of the N,N,dialkylcarboxylamide class are useful as solvents in the process. The preferred solvents are the lower molecular weight members of this class, particularly N,N-dimethylformamide and N,N-diethyl-acetamide. Other useful solvents are N,N-diethyl-formamide, N,N-diethylacetamide, N,N-dimethylmethoxy-acetamide, N-methyl caprolactam, and the like. Other solvents which may be used include dimethylsulfoxide. N-methyl-2-pyrrolidone, tetramethyl urea, pyridine, dimethylsulfone, hexamethylphosphoramide, tetramethy-lene sulfone, formamide, N-methylformamide, butyro-lactone and phenols such as m-cresol. The solvents can be used alone or in combinations.

To obtain the maximum inherent viscosity, i.e., maximum degree of polymerization, for any particular combination of monomers, solvent, etc., and thus produce shaped articles such as films and filaments of optimum toughness, it has been found that the temperature throughout the reaction should be maintained below 50° C., preferably below about 35° C.

The degree of polymerization of the polyamide-imides is subject to deliberate control. The use of equimolar amounts of the reactants under the prescribed conditions provides polyamide-imides of very high molecular weight. The use of either reactant in large excess limits the extent of polymerization. In addition to using an excess of one reactant to limit the molecular weight of the polyamide-imides, a chain terminating agent such as phthalic anhydride may be used to "cap" the ends of the polymer chains. Typical useful capping agents are monoanhydrides or monoamines such as phthalic anhydride, aniline or p-methylaniline.

In the preparation of the polyamide-imides, it is desired that the molecular weight be such that the inherent viscosity of the polymer is at least about 0.1 dl/g, more preferably from about 0.2 to about 1.5 dl/g. The inherent viscosity is measured at 25° C. at a concentration of 0.5% by weight of the polymer in a suitable solvent such as dimethylacetamide.

The quantity of organic solvent used in the process need only be sufficient to dissolve enough of one reactant, preferably the diamine, to initiate the reaction of the diamine and the other monomers. It has been found that the most successful results are obtained when the solvent represents at least 60% of the final solution, that is, the solution should contain 0.05–40% as weight of the polymeric component, more preferably 5 to 25% by weight.

The second step of the process (dehydration) is performed by treating the polyamide-polyamic acid with a dehydrating agent alone or in combination with a tertiary amine such as acetic anhydride or an acetic anhydride-pyridine mixture. The ratio of acetic anhydride to pyridine can vary from just above zero to infinite mixtures.

Tertiary amines having approximately the same activity as the preferred pyridine can be used in the process. These include isoquinoline, 3,4-lutidine, 3,5-lutidine, 4-methyl pyridine, 3-methyl pyridine, 4-isopropyl pyridine, N,N-dimethyl benzyl amine, 4-benzyl pyridine, and N,N-dimethyl dodecyl amine. These amines are generally used from 0.3 to equimolar amounts with that of the anhydride converting agent. Trimethyl amine and triethlene diamines are much more reactive, and therefore are generally used in still small amounts. On the other hand, the following operable amines are less reactive than pyridine: 2-ethylpyridine, 2-methyl pyridine, triethyl amine, N-ethyl morpholine, N-methyl morpholine, diethyl cyclohexylamine, N,N-dimethyl cyclohexylamine, 4-benzoyl pyridine, 2,4-lutidine, 2,6-lutidine and 2,4,6-collidine, and are generally used in larger amounts.

An alternative method for the preparation of the polyamide-imides is the thermal dehydration of the intermediate polyamide-polyamic acid. This transformation is generally performed in bulk, preferably in the form of a shaped article, e.g., film or filament of the polyamic acid. The dehydration is conducted stepwise starting at temperatures of about 100° C. and increasing the temperature progressively to about 300° C. or even higher, depending on the particular case, towards the end of the imidiazation step. The reaction is preferably performed under an inert atmosphere, and atmospheric or reduced pressures can be employed.

The polyamide-imides of the present invention generally have a weight average molecular weight ($M_w$) within the range of from about 5,000 to about 50,000 or more.

The following examples are illustrative of the invention:

EXAMPLE 1

This example details the preparation of a polyamide-imide having the structure of Formula 1 above and based on the reaction product of 0.01 moles of 4-trimellitoyl anhydride chloride (4-TMAC) and 0.01 moles of 4,4'-bis [4-(aminophenoxyphenyl)hexafluoroisopropyl] diphenyl ether (12F-Oxydiamine) to yield a polyamide-imide polymer having the structure of Formula 1 wherein (a) is zero.

A 250 ml 3 neck flask, fitted with a stirrer, condenser, Y tube, powder addition funnel, thermometer, dry ice-acetone cooling bath and nitrogen blanket was charged under nitrogen atmosphere with 5.0 grams (0.01 moles) of 12F-Oxydiamine along with 40 grams of reagent grade dimethyl acetamide (DMAC). The mixture was stirred to dissolve the diamine and cooled down to a temperature of about −10° C. 2.13 grams (0.01 moles) of 4-TMAC was then gradually added to this solution over a period of about 30 minutes time while continuing agitation and maintaining a temperature of about −5° C. under nitrogen atmosphere. The beaker containing the 4-TMAC was rinsed with 15 grams of additional DMAC and this was also added to the polymerization solution. The temperature of the solution was allowed to rise to 5° C. and 1.12 grams of triethylamine was charged dropwise over about 30 minutes time under nitrogen atmosphere while continuing agitation. Thereafter, 27 grams of DMAC was charged under nitrogen and the reaction mass was agitated at a temperature of 15° C. for one hour. Thereafter, 8.0 grams of pyrridine and 10.0 grams of acetic anhydride was charged under nitrogen atmosphere and the reaction mass was then allowed to agitate for about 18 hours at room temperature to complete cyclization. The reaction mass was then filtered to remove pyrridine hydrochloride. The polymer formed above was precipitated form solution in methanol by the addition of methanol to the reaction liquor, that is by reverse precipitation, using about 1000 ml of methanol for every 250 grams of polymeric solution. The resulting polymer was then washed with water and methanol, and chopped to a fine powder as an aqueous suspension in a mechanical blender. The powder was dried overnight in a vacuum oven at 60°–65° C.

This polymer has the formula comprising recurring groups of the structure:

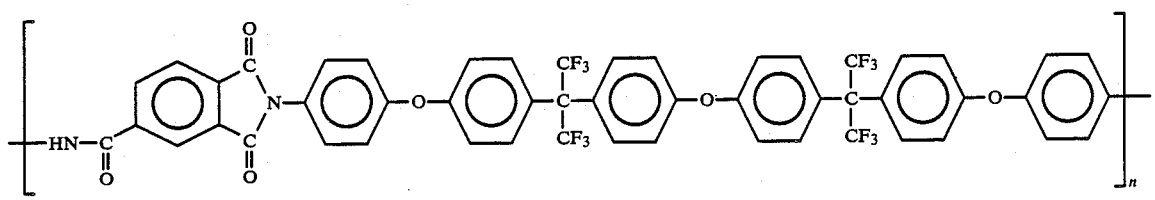

EXAMPLE 2

The process of Example 1 was repeated as set forth, except the 12-F Oxydiamine was replaced with 0.01 mole of 4,4'-bis[2-(4-aminophenyl)hexafluoroisopropyl] diphenyl ether (12-F Diamine). This polymer has the formula comprising recurring groups of structure:

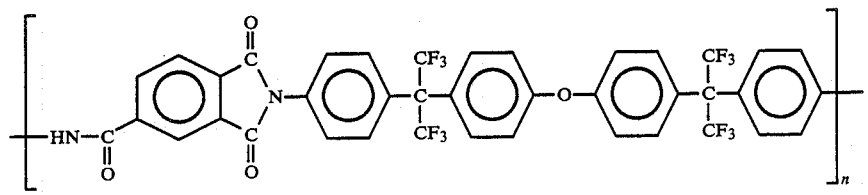

EXAMPLE 3

The process of Example 2 was repeated as set forth, except that the amino reactants were composed of a mixture of 0.002 moles of 12F-Diamine and 0.008 mols of oxydianiline. This process gave rise to a polymer having the structure of Formula 1 above wherein (a) is 0.8 and (b) is 0.2.

COMPARATIVE EXAMPLE 4

This example sets forth the preparation of a control polyamide-imide of the prior art which does not contain the fluorine-containing monomer. The control polymer is based on the reaction product of 0.12 moles of methylene dianiline (MDA) and 0.12 moles of 4-TMAC to yield a polyamide-imide of the prior art having the structure:

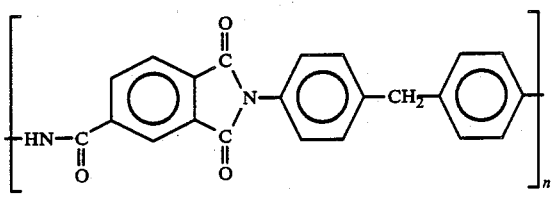

The procedure of Example 1 was repeated but the following materials and quantities were employed:

| MDA | 24.0 grams |
| 4-TMAC | 25.2 grams |
| DMAC | 278.0 grams |
| Pyrridine | 45.4 grams |
| Triethylamine | 13.2 grams |
| Acetic anhydride | 65.0 grams |

Polymerization was conducted and sequential additions of the above reactants and materials and polymer recovery was as set forth in Example 1. 42.5 grams of a lime-green polymer in powdered form was obtained.

Properties of the polyamide-imide polymers prepared in accordance with Examples 1–4 appear in Table 1.

TABLE 1

| Example | 4-TMAC mole % (acid side) | 12F-Diamine or Oxydiamine | Diamine | Inherent Viscosity dl/gm. | GPC | | | DSC Tg deg. C. | TGA 5% wt. loss deg. C. |
| --- | --- | --- | --- | --- | --- | --- | --- | --- | --- |
| 1 | 100 | 100 | 0 | 0.54 | 47000 | 23000 | 2.0 | 290 | 500 |
| 2 | 100 | 100 | 0 | 0.25 | 21980 | 10469 | 2.1 | 232 | 460 |
| 3 | 100 | 20 | 80 (ODA) | 0.62 | * | * | * | 281 | 485 |
| 4 Control | 100 | 0 | 100 (MDA) | 0.33 | 41300 | 20700 | 2.0 | 271 | 510 |

Note
*Not tested due to insolubility of the polymer in solvent.

The molecular weight of the polymers, whether weight average molecular weight ($M_w$) and number average molecular weight ($M_n$) of the polymer of example 2 was measured by gel permeation chromatography (GPC) performed on dilute solutions of the polymer in tetrahydrofuran (THF). The actual apparatus employed consisted of a Waters (Millipore Corp.) programmable automatic sampler, vacuum pump, chromatography columns with heater, and a differential refractometer connected to a Shimadzu CR 30A data reduction system with accompanying software (version 1.1, Shimadzu part No. T/N 22301309-91). The refractormeter used was a Waters model 410 and four chromatography columns, 500 Angstron, 1000 Angstron, 10,000 Angstron and 100,000 Angstron (available from Waters) were connected in series. The system was calibrated using multiple available polystyrene standards ranging in molecular weight as follows:

| GPC CALIBRATION | |
|---|---|
| Calibration Standard (Polystyrene) | Mol. Wt. |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated the weight average molecular weight $M_w$, the number average molecular weight $M_n$, and polydispersity (d), $M_w/M_n$ were obtained relative to a polystyrene standard for polymers produced in accordance with the Examples given hereinabove.

Glass transition temperatures (Tg) were determined by differential scanning calorimetry using a Perkin Elmer DSC-4 calorimeter operating at 20° C./min., nitrogen atmosphere at 60 cc/min. Glass transition temperature by this method is generally defined as the point of intersection of tangent lines about the point of first inflection of the heating curve of the polymer. Thermogravimetric analysis (TGA) was performed with a Perkin Elmer 65-2 analyzer at 20° C./min. with an air rate of 80 cc/min. TGA values given herein are for five percent weight loss; in other words, the temperature at which 5% weight loss is observed is reported.

As is evident from the data in Table 1, the polyamide-imides of the present invention have Tg values approaching or higher than the control polyamide-imide of Example 4 while at the same time exhibiting improved flow properties and injection molding properties. Thus, the flow properties of the polymers of this invention are markedly improved without significant alteration of the glass transition temperature (Tg).

EXAMPLE 5

The flow properties of the polyamide-imides of this invention, the control of Example 4, and a commercially available polyamide-imide sold by Amoco under its Trade Name Torlon ® 4203L may be compared by forming compression molded discs of each polymer type. Discs of approximately 1 inch diameter were prepared using a hot press and piston cylinder mold to form the molded discs. Approximately ½ inch of polymer in powder form was sprinkled into the bottom of a mold piston and the piston was inserted between the pallets of a hot press and heated to 300° C. After coming to temperature, a pressure of 2000 psi was applied to the piston for 3 minutes. The pressure was then released, the mold cooled and the molded polymer disc having a thickness of about 20 mil was removed from the mold. Each of the polymers of Examples 1, 2 and 3 produced a clear, transparent, off-white or yellow disc having good flexural properties. The control disc of Example 4 was a non-transparent, compressed, fused yellow powder which was sintered in nature, indicative of poor flow and poor molding properties. The disc made from TORLON was in the form of compressed, fused yellow-green pellets.

The polyamide-imides of the present invention may be used in their preimidized form (polyamide-polyamic acid) as solutions in organic solvent to produce films, coatings, composites and the like which may be cured in-situ to form the polyamide-imide by the application of heat.

The polyamide-imides may be molded using techniques such as compression molding or injection molding to produce melt fabricated articles such as fibers, films, safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polyamide-imides may also be compounded with friction materials to produce molding compounds for high temperature braking components or with abrasive materials such as diamonds for high speed grinding wheels.

The polyamide-imides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

The polyamide-imides may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polyamide-imides may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

In general, the polyamide-imides and polyamic-acid precursors of this invention may be used in all applications as disclosed in copending application Ser. No. 124,704, filed in the U.S. Patent and Trademark Office on Nov. 24, 1987, the disclosure of which application is incorporated herein by reference.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A polyamide-imide polymer containing at least one recurring structural unit of the formula:

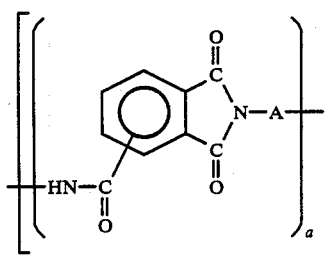

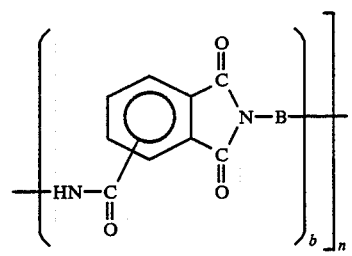

wherein the terms (a) and (b) are equal to the mole fraction of each recurring unit in the polymer chain and (a) ranges from about 0.0 to about 0.95, (b) ranges from about 0.05 to about 1.00, the sum of (a) and (b) being equal to 1, n is a number sufficient to give rise to a polymer having an inherent viscosity of at least about 0.1 dl/g as measured from a solution of the polymer in dimethylacetamide at 25° C. at a polymer concentration of 0.5 weight percent, A is the residuum of a divalent aromatic diamine and B is a residuum of a divalent aromatic diamine having the structure:

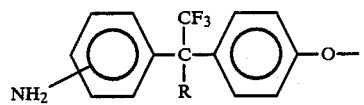 (i)

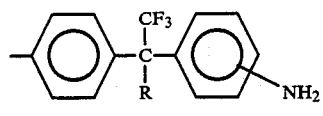

or

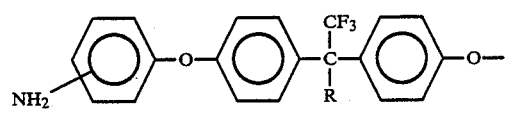 (ii)

-continued

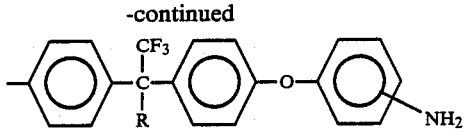

2. The polymer of claim 1 prepared by the polycondensation polymerization of a mixture of a trimellitoyl anhydride chloride and at least one diamine selected from the group consisting of 4,4'-bis[4-(aminophenoxyphenyl)hexafluoroisopropyl] diphenyl ether, 4,4'-bis[3-(aminophenoxyphenyl)hexafluoroisopropyl] diphenyl ether, 4,4'-bis[2-(4-aminophenyl)hexafluoroisopropyl] diphenyl ether and 4,4'-bis[2-(3-aminophenyl)hexafluoroisopropyl] diphenyl ether.

3. The polymer of claim 2 wherein said anhydride and diamine monomers are reacted in approximately equimolar amounts.

4. The polymer of claim 2 wherein said anhydride monomer is 4-trimellitoyl anhydride chloride.

5. The polymer of claim 4 wherein (a) is zero.

6. The polymer of claim 1 having an inherent viscosity of at least about 0.2 dl/g.

7. The polymer of claim 2 which further contains a different aromatic diamine having the formula $NH_2$—R—$NH_2$, wherein R is the aromatic moiety of a phenylene, naphthalene, or bis or polyphenylene type compound.

8. The polymer of claim 7 wherein said different diamine has the structure

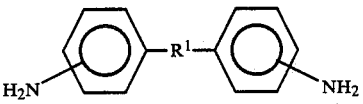

wherein R' is a divalent moiety independently selected from a covalent carbon to carbon bond, methylene, ethylene, propylene, isopropylene, hexafluoroisopropylidine, 1-phenyl-2,2,2-trifluoroethylidene, dichloro and difluoroalkylenes up to 3 carbons, oxy, thio, sulfinyl, sulfonyl, sulfonamido, carbonyl, oxydi- carbonyl, oxydimethylene, sulfonyldioxy, carbonyldioxy, disilanylene, polysilanylene up to 8 Si atoms, disil- oxanylene, and a polysiloxanylene up to 8 Si atoms.

9. The polymer of claim 7 wherein (a) ranges from about 0.05 to about 0.95 and (b) ranges from about 0.95 to about 0.05.

10. The polymer of claim 9 wherein R' is oxygen.

11. The polymer of claim 9 wherein R' is methylene.

12. The polymers of claims 5 or 7 wherein the inherent viscosity ranges from about 0.1 to about 1.5 dl/g.

13. A shaped article comprising the polymers of claim 1 or claim 7.

14. The article of claim 13 wherein said article is a compression molded article.

* * * * *